United States Patent [19]

D'Agosto, III et al.

[11] Patent Number: 4,658,097

[45] Date of Patent: Apr. 14, 1987

[54] REMOTE TERMINAL FOR USE WITH CENTRAL DICTATION APPARATUS

[75] Inventors: Nicholas A. D'Agosto, III, Trumbull, Conn.; Alan S. Rubinstein, Arcadia, Calif.

[73] Assignee: Dictaphone Corporation, Rye, N.Y.

[21] Appl. No.: 495,756

[22] Filed: May 18, 1983

[51] Int. Cl.⁴ ............ H04M 11/10; H04M 1/64; G11B 19/00

[52] U.S. Cl. ............ 379/75; 369/25; 379/77

[58] Field of Search ............ 179/6.07, 6.09, 6.11, 179/6.03, 6.13, 6.01, 6.02, 6.15, 6.16, 2 A, 87 H, 87 R; 369/25, 26, 29

[56] References Cited

U.S. PATENT DOCUMENTS

| | | | |
|---|---|---|---|
| 3,045,069 | 7/1962 | Sontheimer | 179/6.09 |
| 3,436,483 | 4/1969 | Blane | 179/6 |
| 3,794,764 | 2/1974 | Todd | 179/6.16 |
| 3,835,261 | 9/1974 | Matz | 369/26 |
| 3,895,189 | 7/1975 | Matz | 369/26 |
| 3,943,291 | 3/1976 | Okamura et al. | 179/6.07 |
| 3,953,680 | 4/1976 | Zimmermann | 179/6.11 |
| 3,984,644 | 10/1976 | Matz | 179/2 A X |
| 4,031,323 | 6/1977 | Ando et al. | 179/6.11 |
| 4,092,496 | 5/1978 | Ando et al. | 179/6.16 |
| 4,122,305 | 10/1978 | Fish et al. | 179/6.09 |
| 4,258,232 | 3/1981 | Smith et al. | 179/99 H X |
| 4,328,397 | 5/1982 | Chamberlin | 179/6.09 |
| 4,373,117 | 2/1983 | Pierce | 375/8 X |
| 4,387,272 | 6/1983 | Zastro et al. | 179/6.07 |
| 4,395,590 | 7/1983 | Pierce et al. | 375/8 X |
| 4,399,331 | 8/1983 | Brown et al. | 179/6.13 |
| 4,408,153 | 10/1983 | Terry | 179/81 R X |
| 4,417,099 | 11/1983 | Pierce | 375/8 X |
| 4,435,622 | 3/1984 | Grantland et al. | 179/81 R |
| 4,469,919 | 9/1984 | Nakamura et al. | 179/6.07 |
| 4,488,274 | 12/1984 | Plunkett | 369/25 |
| 4,503,288 | 3/1985 | Kessler | 179/6.13 |

FOREIGN PATENT DOCUMENTS

| | | |
|---|---|---|
| 833159 | 4/1960 | United Kingdom . |
| 853990 | 11/1960 | United Kingdom . |
| 936814 | 9/1963 | United Kingdom . |
| 1087127 | 10/1967 | United Kingdom . |
| 1131663 | 10/1968 | United Kingdom . |
| 1265541 | 3/1972 | United Kingdom . |
| 1354796 | 5/1974 | United Kingdom . |

OTHER PUBLICATIONS

Intel 1983, Product Guide, p. 40.

Primary Examiner—Aristotelis M. Psitos
Attorney, Agent, or Firm—Curtis, Morris & Safford

[57] ABSTRACT

A remote terminal for connection to telephone lines to enable an operator thereat to communicate with dictation apparatus. The remote terminal includes a power supply which receives the DC power normally applied to the telephone line to derive energizing power therefrom for powering the terminal. An audio coupling circuit couples audio frequency signals to and from the telephone lines and is selectively connected to a handset by which the operator may transmit and receive speech signals over the telephone lines, or to a headset by which the operator may receive dictated information from the dictation apparatus. Function control switches, such as foot-pedal switches, are selectively operable to control the dictation apparatus, and a mode selector serves to select either a telephone operating mode for the remote terminal, whereby the function control switches are rendered inoperative, or a dictate/transcribe operating mode for the remote terminal, whereby the function control switches are rendered operative. A processor, such as a microprocessor, powered by the power supply, is responsive to the mode selector and to the function control switches for controlling the operating mode of the remote terminal and for enabling the remote terminal to communicate with the dictation apparatus.

19 Claims, 8 Drawing Figures

REMOTE TERMINAL FOR USE WITH CENTRAL DICTATION APPARATUS

BACKGROUND OF THE INVENTION

This invention relates to a remote terminal adapted to be connected to telephone lines and, more particularly, to such a remote terminal that functions either as a telephone or as a dictate/transcribe terminal, the latter enabling a user to communicate via telephone lines with dictation apparatus.

Central dictation systems are known wherein one or more recording devices are disposed at a central location and are coupled to dictation units and also to transcription units. Examples of such central dictation systems are described in U.S. Pat. Nos. 3,839,600 and 4,041,249. Typically, the recording units are connected by "fixed" or "private" wire connections to the dictation and transcription units. A private wire connection generally consists of multi-wire cables which fixedly connect the dictation and transcription units to the recording devices. In installations having several recording devices, switching networks are provided to selectively connect one of several different dictation units to a particular recording device. The criteria of connection has been based upon availability of the recording device, that is, whether it is already connected to another dictation unit, or the amount of dictation that has been recorded on that device, or the delay in completing transcription (the turn around time), or the like. Also, in private wire central dictation systems, a particular transcription unit is connected directly to a respective one of the recording devices. Thus, in private wire central dictation installations, dedicated conductor connections are used to couple the recording devices to respective dictation and transcription units.

One disadvantage of a private wire central dictation system is the relatively high cost of expanding that system. Since the recording devices are connected by fixed, or dedicated, lines to the respective dictation and transcription units, the addition of further devices and/or units must be made by installing additional lines therebetween. If this installation is made in an existing office building, for example, major renovations might be needed to install these additional lines.

Another disadvantage of a private wire central dictation system is the general inability to communicate with the recording devices, either for dictation or for transcription, from a remote location. Telephone coupling arrangements have been proposed to permit a user situated at a remote location to transmit dictated information over telephone lines for recording at a central location. One example of such a telephone coupling arrangement is described in U.S. Pat. No. 3,895,189. However, in a typical telephone-connection, a relatively simple adapter is used as an interface between the telephone line and the recording device such that, when actuated, the recording device is turned "on" and speech signals may be recorded. These adapters do not easily permit full control over the recording device by the user. Thus, the user might not be able to rewind the record medium, review, or listen to, previously recorded dictation, or rapidly advance the record medium to continue with dictation.

In order to provide additional control over the dictation process (e.g. to provide for the usual "rewind", "play", "fast-forward" and "stop" functions) via telephone lines, it has been suggested that the usual multi-frequency dialing tone signals (known as Touch-Tone signals) that are generated from the push-buttons provided on conventional Touch-Tone telephone sets be used to control the recording device. For example, the user might operate push-button "1" to transmit a "stop" function, he might operate push-button "2" to implement a "rewind" operation, he might operate push-button "3" to initiate a "fast-forward" operation, he might operate push-button "4" to effect a "dictate" operation and he might operate push-button "5" to effect a "play" operation. However, it may be confusing to the user to remember the particular functions which are associated with such push-buttons and, moreover, he may find it inconvenient to utilize his telephone set in the aforementioned manner when he has become accustomed to a so-called "full function" microphone or handset unit. For example, the user might be well-acquainted with a dictation handset of the type described in U.S. Pat. No. 3,872,273; and he may find it inconvenient or uncomfortable to transmit dictation commands by operating the usual telephone set push-buttons.

A remote dictation unit has been proposed for connection to a central recording device via telephone lines wherein command signals are generated by operating the usual dictate handset. While this avoids the inconvenience of controlling dictation by way of the telephone set push-buttons, this proposed unit is limited to communication with the recording device. The unit is not provided with push-buttons or with a rotary dial by which the user may operate his unit as a conventional telephone.

The aforementioned disadvantages associated with remote dictation via telephone lines also accompany remote transcription by which previously dictated information is played back from a centrally disposed recorder over telephone lines to a remote location whereat the transcriptionist transcribes that played back information. Typically, control over the recorder from the transcribe unit has been effected by operating the usual push-buttons of the telephone set. This is quite inconvenient if the transcriptionist is operating a typewriter. "Hands-free" control over the recorder, as by the operation of foot-pedal switches, is preferred. It has been proposed to provide a remote transcription unit which is coupled to a central recorder by telephone lines and which includes foot-pedal switches and other operating controls by which the operation of the recorder is effected. However, in that proposal, a full "dial-out" capability is not available and, thus, the unit cannot operate as a true telephone. Also, the proposed unit is operable with Touch-Tone telephone lines and cannot gain access to a central recorder via "dial-pulse" telephone lines.

There is, therefore, a need for a dual-function terminal capable of being operated as a telephone, including full "dial-out" capabilities, and as a dictate/transcribe unit capable of recording dictation on or transcribing dictation from a centrally disposed recorder. Also, there is a need for such a terminal which is operable on both "Touch-Tone" and "dial-pulse" telephone lines.

OBJECTS OF THE INVENTION

It is an object of the present invention to provide a remote terminal for connection via telephone lines to dictation apparatus, the terminal being operable as a telephone or a dictate/transcribe unit.

Another object of this invention is to provide a remote terminal of the aforementioned type having a dial signal generator for generating dialing signals of either the multi-frequency tone or dial-pulse type.

A further object of this invention is to provide a remote terminal of the aforementioned type having function control switches, such as foot-pedal switches, the operation of which effects corresponding control over the dictation apparatus.

An additional object of this invention is to provide a remote terminal of the aforementioned type having a power supply that is energized by the DC power normally applied to telephone lines for energizing the electronic circuitry of the terminal.

A still further object of this invention is to provide a remote terminal of the aforementioned type having a mode selecting switch that is operable to select a telephone operating mode or a dictate/transcribe operating mode for the terminal.

Various other objects, advantages and features of the present invention will become readily apparent from the ensuing detailed description, and the novel features will be particularly pointed out in the appended claims.

SUMMARY OF THE INVENTION

In accordance with the present invention, a remote terminal is provided for connection to telephone lines to enable an operator at the terminal to communicate with dictation apparatus via those lines. The terminal includes an audio coupling circuit which selectively couples a handset having microphone and speaker to the telephone line. In accordance with one aspect of this invention, the audio coupling circuit selectively couples a headset having a speaker to the telephone line, to permit the operator to listen to dictated information which is played back over that line. A mode selector is operative to select a telephone operating mode for the terminal, whereby connection is made between the audio coupling circuit and the handset, and to select a dictate/transcribe operating mode, whereby connection is made between the audio coupling circuit and the headset. A processor, such as a microprocessor, is responsive to the operation of the mode selector to establish the operating mode of the terminal.

In accordance with another aspect of this invention, function control switches, such as foot-pedal switches, are selectively operable to control the dictation apparatus to operate in a selected one of plural modes. The processor is responsive to the operation of the function control switches to control the operation of a control signal generator which, in turn, transmits control signals over the telephone lines to the dictation apparatus.

It is another aspect of this invention to provide pushbuttons at the terminal, the operation of which is sensed by the processor for controlling the control signal generator. When the telephone operating mode is selected, the operation of the push-buttons serves to transmit multi-frequency dialing signals. When the dictate/transcribe operating mode is selected, the operation of some of the push-buttons serves to transmit function control signals to the dictation apparatus. It is a feature of this invention to enable the operation of the push-buttons in the telephone operating mode to transmit either multi-frequency dialing signals or dial pulses such that the remote terminal is capable of dialing a remote telephone number via Touch-Tone or dial pulse telephone lines.

In accordance with yet another aspect of this invention, the terminal is provided with a power supply circuit that generates energizing power for the terminal from the DC power that normally is applied to the telephone lines. There is no need, therefore, for an auxiliary power source for the electronic circuitry included in the terminal.

In accordance with a still further aspect of this invention, the terminal is adapted to transmit a predetermined disconnect tone signal to the dictation apparatus to apprise the latter that the terminal has "hung up". This avoids the possibility of maintaining the dictation apparatus connected to the telephone line indefinitely because of a failure of the telephone switching equipment to indicate that the remote terminal has hung up.

An additional aspect of this invention is to limit or restrict the dial-out capability of the remote terminal such that the operator may communicate only with selected, predetermined locations. For example, only a pre-set telephone number may be dialed, although this number can be changed manually.

BRIEF DESCRIPTION OF THE DRAWINGS

The following detailed description, given by way of example, will best be understood in conjunction with the accompanying drawings in which.

DETAILED DESCRIPTION OF A CERTAIN PREFERRED EMBODIMENT

Figure 1:
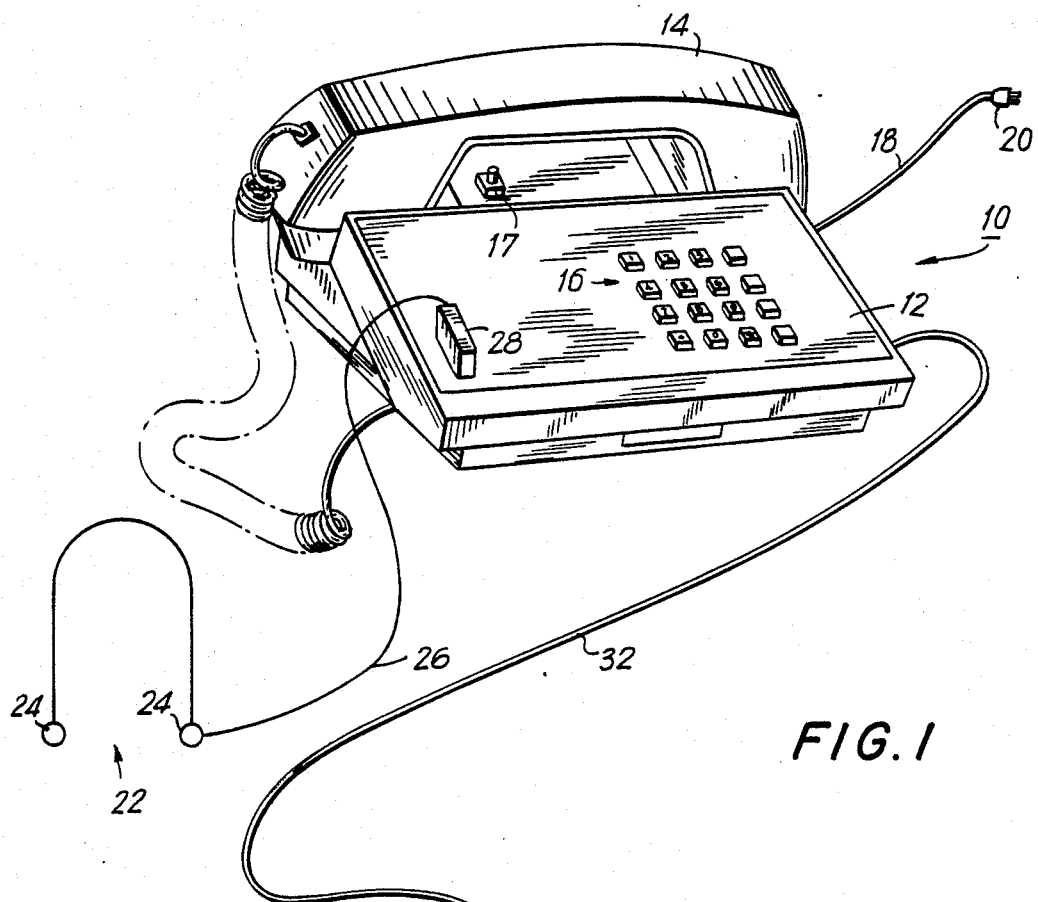
FIGS. 1 and 1a are a schematic representation of the remote terminal in accordance with the present invention.
Figure 1A:
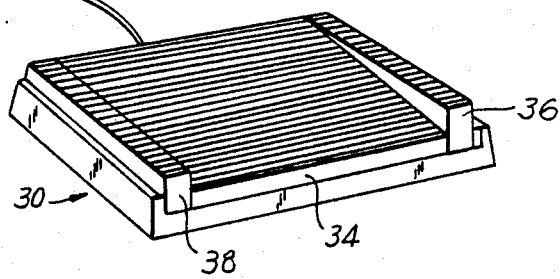
Figure 1A:
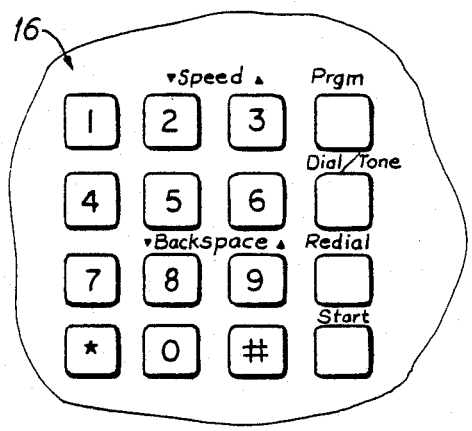

Referring now to the drawings, and in particular to FIG. 1, there is illustrated a preferred embodiment of a remote terminal 10 that may be connected to telephone lines to permit the user of the terminal to establish telephone communication with a called party and also to communicate via the telephone lines with dictation apparatus that is disposed at a central location. Remote terminal 10, as illustrated in FIG. 1, is particularly configured for transcribing dictated information from the recorder associated with the central dictation apparatus. As will be described, a similar remote terminal may be used to control the dictation apparatus for the purpose of recording dictation.

Remote terminal 10 is comprised of a base 12 and a handset 14. The handset is provided with a microphone and a speaker mounted in a handle and is similar in appearance to the conventional handset of a typical telephone. In the position illustrated in FIG. 1, handset 14 is placed in a cradle having a hook-switch therein, this hook-switch being opened when the handset is placed in the cradle and being closed when the handset is removed. Closure of the hook-switch is commonly referred to as the off-hook condition, and the opening of the hook-switch commonly is referred to as the on-hook condition.

Base 12 is provided with push-buttons 16. These push-buttons are arranged in a 4×4 matrix having the usual telephone-type push-buttons 0-9, * and #. These conventional push-buttons are arranged in a 3×4 matrix. An additional column of push-buttons serves to control the operating mode and operating functions of terminal 10. For example, a "START" button is provided to dial automatically a predetermined, or programmed, telephone number, as will be described, or to establish a dictate/transcribe mode of operation. The functions of the remaining push-buttons will be described in greater detail hereinbelow.

Also provided is a "program enable" switch 17 which, advantageously, is concealed from view. This switch, when operated, permits an authorized operator to change the telephone number which will be dialed automatically in the event that terminal 10 is conditioned for restricted use, as will be described.

The terminal is coupled by way of a multi-conductor cable 18 to a jack 20. This jack preferably is of the so-called "modular jack" type conventionally used to connect telephone sets to telephone lines. A suitable socket (not shown) is adapted to receive jack 20 so as to connect terminal 10 to the telephone lines coupled thereto.

When connected as a transcribe terminal, remote terminal 10 is provided with a headset 22 and a foot-pedal assembly 30. Headset 22 includes a pair of earphones 24 which are coupled by conductors 26 to a connector plug 28 for connection to a suitable socket in base 12. Foot-pedal assembly 30 is connected by means of a conductor cable 32 to base 12. The foot-pedal assembly is provided with a playback foot-pedal switch 34, a rewind foot-pedal switch 36 and a fast-forward foot-pedal switch 38. The operation of these switches when terminal 10 is coupled by the telephone lines to dictation apparatus controls the operation of the recorder at that dictation apparatus to effect playback, rewind or fast-forward of the record medium upon which information has been dictated.

The manner in which an operator utilizes remote terminal 10 now will be described. When operating as a telephone, handset 14 is removed from its cradle to close the hook switch. If the terminal is disposed for unrestricted use, the operator then may depress push-buttons 16 in the usual manner to call a desired telephone number. When the calling party answers, telephone communication may proceed by way of the microphone and speaker included in handset 14 in the conventional manner.

Let it be assumed that the operator calls the central location at which is disposed dictation apparatus that is compatible with terminal 10. If the telephone line to which jack 20 is connected is of the Touch-Tone type, push-buttons 16 are operated to generate multi-frequency calling signals which are transmitted over that telephone line. However, if the telephone line to which jack 20 is connected is of the dial-pulse type, then a suitable selector switch (not shown) is operated such that dial pulses are generated in response to the actuation of push-buttons 16.

When terminal 10 is connected to the central dictation apparatus, a suitable acknowledgement signal, such as an acknowledgement tone, is perceived by the operator. If the operator then depresses the "START" button, the microphone and speaker of handset 14 are inhibited and headset 22 now is enabled. Furthermore, the selected operation of foot-pedal assembly 30 now results in the transmission of corresponding control tone signals over the telephone lines to the dictation apparatus to effect playback, stop, rewind and fast-forward control over the recorder. Hence, previously recorded dictated information is played back and is sensed by the operator by way of headset 22. The operator may proceed with transcribing this dictated information in the same manner as if terminal 10 were connected by private wire to the recorder.

In one type of dictation apparatus with which terminal 10 may be used, when playback foot-pedal switch 34 is released, the record medium is reversed, or backspaced, by a small amount. When the playback foot-pedal next is operated, the operator hears the last portion of the information which had been played back previously. The amount of this backspacing may be controlled by selected operation of push-buttons "8" and "9". Each actuation of push-button "8" reduces the quantity of record medium which is backspaced by an incremental amount, and each actuation of push-button "9" increases this quantity by an incremental amount. Also, to regulate the speed at which the previously dictated information is played back, the operator may actuate push-buttons "2" and "3" to incrementally decrease and increase, respectively, the playback speed.

If, while connected to the central dictation apparatus, the operator of terminal 10 wishes to utilize the terminal as a telephone, the operation of the "START" button changes over the operating mode of the terminal to enable this telephone communication.

One or more desired telephone numbers may be stored in a suitable memory included in terminal 10 and may be read out from that memory to transmit dialing signals merely upon the actuation of the "START" button. If the terminal is conditioned for restricted use, dialing signals are transmitted only by the actuation of the "START" button; push-buttons 16 being rendered inoperative to generate dialing signals. The desired telephone number may be stored in the memory by actuating push-buttons 16 in the usual manner to "dial" that number, and then, after the entire number has been so generated, the "PRGM" button is actuated and held for a predetermined time duration. This writes each digit of the generated number into the memory. If the terminal is conditioned for restricted use, program enable switch 17 first must be operated to enable the generated digits to be stored. The stored telephone number subsequently is read out when the "START" button is depressed. The read out telephone number then is transmitted over the telephone line, either as multi-frequency tones or as dial pulses, as may be selected.

If, after calling a desired telephone number, that number is "busy", the very same number may be redialed by actuating the "REDIAL" button.

As mentioned above, the embodiment shown in FIG. 1 is particularly adapted to function as a remote transcription terminal. Alternatively, terminal 10 may be constructed as a remote dictation terminal by, for example, replacing handset 14 with a handset having manually operable control switches thereon, such as described in U.S. Pat. No. 3,872,263. As a dictation terminal, the operation of the "START" switch serves to selectively enable or inhibit these control switches, such that the switches are inhibited when terminal 10 is disposed in its telephone operating mode and are enabled when the terminal is disposed in its dictate operating mode. In both modes, the microphone and speaker included in the handset transmit and receive speech signals to and from the telephone line.

Figure 2:
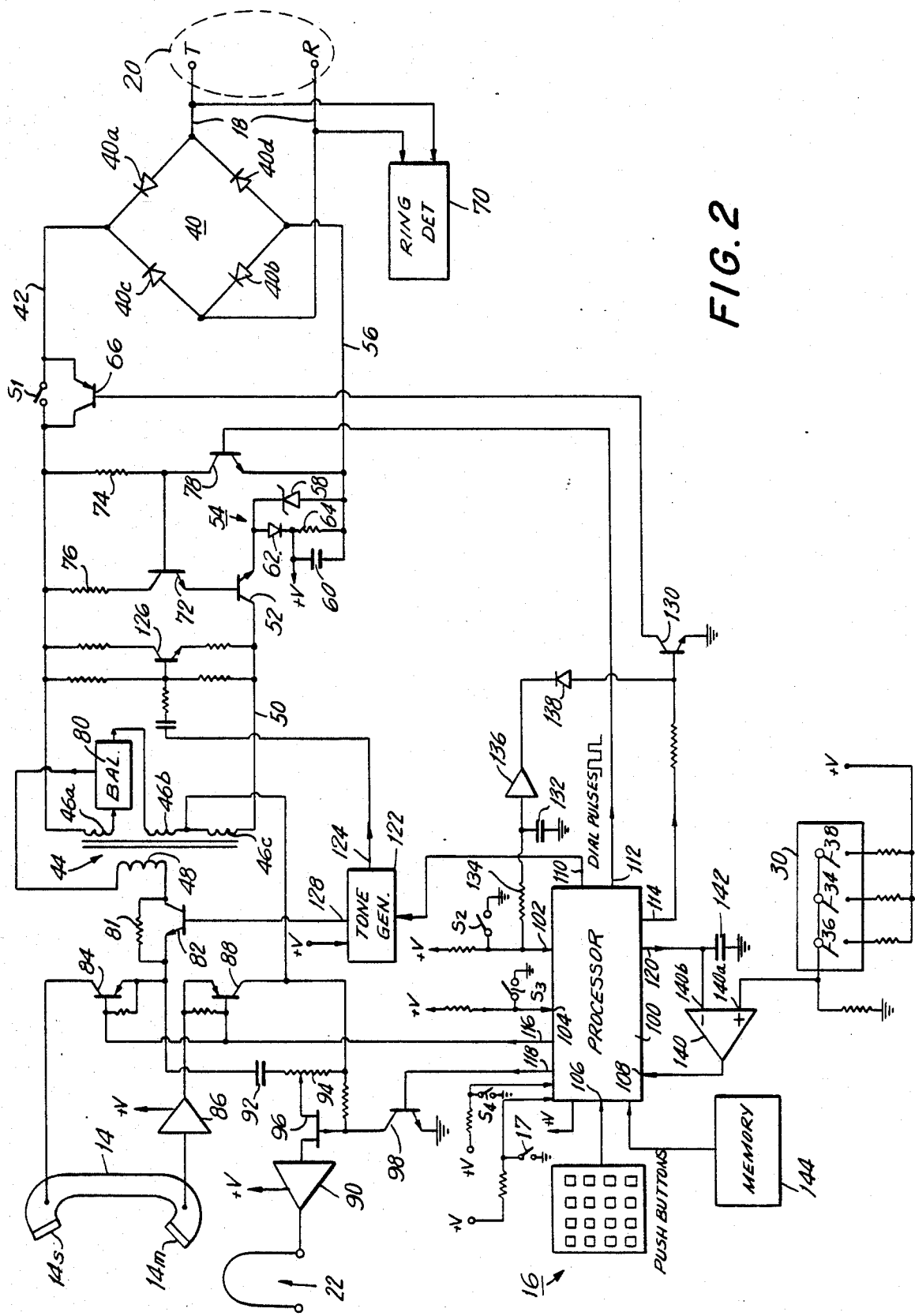
FIG. 2 is a partial schematic, partial block diagram of the electronic circuitry included in the remote terminal.

Turning now to FIG. 2, there is illustrated in partial schematic partial block form, one embodiment of the electronic circuitry included in remote terminal 10. This circuitry is comprised of a polarity guard circuit 40 coupled via leads included in cable 18 to jack 20 for connection to the tip (T) and ring (R) leads of the conventional telephone line. The embodiment of FIG. 2 also includes hook switch S₁, a transistor 52, a power supply circuit 54, an audio coupling circuit 44, handset enabling transistors 84 and 88, a headset enabling transistor 98, a processor 100, a tone generator 122 and an analog-to-digital (A/D) converter including a differential amplifier 140 and a charging capacitor 142.

Polarity guard circuit 40 is formed as a full wave rectifier and is adapted to supply DC potentials of the proper polarity notwithstanding a polarity change-over that may be provided on the tip and ring leads of the telephone line. The polarity guard circuit is coupled to hook switch S₁ by lead 42, and the hook switch is, in turn, coupled to audio coupling circuit 44. The audio coupling circuit is provided in a DC loop and is coupled by a lead 50 through transistor 52 and power supply circuit 54 to lead 56 and thence through polarity guard circuit 40 to the ring lead of the telephone line. As is appreciated, hook switch S₁ normally is opened when handset 14 is placed in its cradle. The hook switch is closed when the handset is removed, that is, when the handset is placed off-hook.

Audio coupling circuit 44 is illustrated herein as a hybrid transformer comprised of primary windings 46a, 46b and 46c and a secondary winding 48. Primary winding 46a is included in a DC circuit from hook switch S₁ through a balancing circuit 80 to series-connected primary windings 46b and 46c, and thence by lead 50 to transistor 52. Balancing circuit 80 is adapted to account for different capacitance due to telephone lines of different lengths. The balancing circuit is of conventional construction and forms no part of the present invention per se. A portion of the balancing circuit also is coupled to secondary winding 48, as illustrated. As will be descirbed, AC currents induced in the secondary winding are supplied to the speaker 14s of handset 14 and also to the speakers included in headset 22.

Transistor 52 has its collector-emitter circuit connected between leads 50 and 56. In the illustrated embodiment, this transistor is formed as an NPN transistor whose base current is controlled by a sense transistor 72. In particular, the sense transistor is adapted to sense the closing of hook switch S₁ to supply base current to transistor 52, whereupon the latter transistor is rendered conductive. The emitter electrode of transistor 52 is coupled through power supply circuit 54 to lead 56.

The power supply circuit is adapted to derive energizing power from the DC power normally applied across the tip and ring leads of the telephone line. The power supply circuit is comprised of a zener diode 58 whose breakdown voltage is on the order of about 5.6 volts. This zener diode is connected between the emitter electrode of transistor 52 and lead 56. A series circuit formed of diode 62 and resistor 64 is connected in parallel with zener diode 58. A capacitor 60 is connected in parallel with resistor 64. It will be appreciated that, when zener diode 58 breaks down, a 5.6 volt voltage drop is produced thereacross, resulting in a voltage drop across parallel-connected capacitor 60 and resistor 64 on the order of about 5 volts. It is this voltage of 5 volts which is supplied to the various circuits included in remote terminal 10 to energize, or "power", the circuitry.

Sense transistor 72 has its emitter electrode coupled to the base electrode of transistor 52 and has its base electrode coupled by way of a resistor 74 to lead 42 via hook switch S₁. The collector electrode of transistor 72 also is coupled through the hook switch to lead 42.

A dial pulse transistor 78 is coupled by way of resistor 74 to lead 42 and, thus, is connected across the tip and ring outputs of polarity guard circuit 40. The base electrode of transistor 78 is supplied with dial pulses derived by processor 100 for the purpose of supplying dialing pulses across the tip and ring leads. Dial pulse transistor 78 is actuated by processor 100 to effect a dial-out operation when terminal 10 is connected to a telephone line which is not adapted to Touch-Tone service.

Secondary winding 48 of the hybrid transformer which comprises audio coupling circuit 44 is coupled by a coupling transistor 82 to handset speaker enabling transistor 84 and to a transistor 96. The collector-emitter circuit of transistor 82 is bridged by an attenuating resistor 81. Handset enabling transistor 84 has its base electrode coupled to an output 116 of processor 100 for receiving a handset enable signal from the processor. In the illustrated embodiment, transistor 84 is shown as a PNP transistor and is rendered conductive by a relatively low level handset enable signal from the processor. When transistor 84 is conductive, its collector-emitter circuit couples handset speaker 14s provided in handset 14 to coupling transistor 82, whereby speech signals, or other signals of audio frequency, induced in secondary winding 48 are coupled to this handset speaker.

Transistor 96 is illustrated as an FET device whose source-drain circuit is coupled between a volume-adjusting potentiometer 94 and a headset amplifier 90. The output of amplifier 90 is coupled to headset 22 and, when FET device 96 is rendered conductive, speech signals, or other signals of audio frequency, are coupled from secondary winding 48 through coupling transistors 82 and potentiometer 94 to headset 22. It is seen that an AC coupling capacitor 92 is connected between the emitter electrode of coupling transistor 82 and the source-drain circuit of FET device 96. The conductivity of the FET device, which is illustrated as a p-type device, is controlled by headset enabling transistor 98. The collector-emitter circuit of transistor 98 is connected between the gate electrode of FET device 96 and a reference potential, such as ground, and the base electrode of this transistor is coupled to a headset enable output 118 of processor 100. It is appreciated that FET device 96 is rendered conductive when a headset enable signal of relatively high level is provided at headset enable output 118 of processor 100.

Handset microphone 14m included in handset 14 is coupled by an amplifier 86 (which preferably is included in the handset structure) through the collector-emitter circuit of handset microphone enabling transistor 88 to primary winding 46c of audio coupling circuit 44. The base electrode of handset microphone enabling transistor 88 is connected in common with the base electrode of handset speaker enabling transistor 84. Thus, when transistor 84 is rendered conductive by the handset enable signal of processor 100, transistor 88 also is rendered conductive by the same handset enable signal. Consequently, speech signals which are received by terminal 10 from the telephone line are coupled by audio coupling circuit 44 to handset speaker 14s, and speech signals which are produced by the operator of terminal 10 are supplied from handset microphone 14m to audio coupling circuit 44 and then to the tip and ring leads to the telephone line for transmission out over that line to a distant location. Conversely, when the headset enable signal is produced by processor 100, incoming speech signals are coupled by audio coupling circuit 44 to headset 22. Advantageously, the handset and headset enable signals are generated mutually exclusively by the processor. Thus, when handset 14 is enabled, as when transistors 84 and 88 are rendered conductive, headset 22 is disabled by rendering transistor 98 non-conductive, thereby effectively "opening" the connection between transistor 82 and amplifier 90. When the headset enable signal is generated, transistors 84 and 88 are rendered non-conductive by processor 100, thereby effectively "opening" the connection between audio coupling circuit 44 and handset 14.

The base electrode of coupling transistor 82 is coupled to a mute output 128 of tone generator 122 whose input is coupled to tone control output 110 of processor 100 to receive control signals so as to generate corresponding tone signals in response thereto. These tone signals are provided at tone signal output 124 of the tone generator and are coupled by an AC coupling circuit to an amplifying transistor 126 for transmission over the telephone line to which terminal 10 is connected. It is preferable to attenuate these tone signals which are fed back from the tip and ring leads via audio coupling circuit 44 to handset 14 during the dial-out mode of operation. Accordingly, the signal supplied to the base electrode of transistor 82 by mute output 128 of tone generator 122 is changed over from an enable signal of relatively high level to an inhibit signal of relatively low level whenever the tone generator is actuated by processor 100. Thus, whenever dialing tone signals are transmitted out over the telephone line, coupling transistor 82 is rendered non-conductive and resistor 81 attenuates the tone signal fed back to handset 14.

A loop hold transistor 66, illustrated as a PNP transistor, has its collector-emitter circuit connected in parallel with hook switch $S_1$ and operates to simulate the closure of the hook switch so as to prevent immediate release of the telephone line in the event that the hook switch is opened, as when the operator may "flash" the hook switch. Loop hold transistor 66 has its base electrode coupled to the collector-emitter circuit of a control transistor 130 the base electrode of which is coupled to a loop hold output 114 of processor 100. The processor is adapted to supply a loop hold signal to control transistor 130 thereby rendering this transistor conductive so as to actuate loop hold transistor 66. Upon termination of the loop hold signal, as when a hang-up operation should be carried out to release the telephone line, control transistor 130 is rendered non-conductive to deactuate loop hold transistor 66. Consequently, the concurrent opening of hook switch $S_1$ and deactuation of the loop hold transistor "opens" the telephone line within terminal 10 such that the telephone line is released.

In the unlikely event that processor 100 malfunctions and fails to terminate the loop hold signal, an additional circuit is provided to insure that control transistor 130 is rendered non-conductive after the hook switch has been opened for some period of time. This circuit is comprised of switch $S_2$, capacitor 132, resistor 134, amplifier 136 and a negatively poled diode 138. Switch $S_2$ is ganged with hook switch $S_1$ and is adapted to be closed when handset 14 is placed upon its cradle and is opened when the handset is removed therefrom. As illustrated, switch $S_2$ is coupled between ground potential and, by way of a resistor, to the energizing voltage $+V$. The junction between switch $S_2$ and this resistor is coupled to hook switch input 102 of processor 100. The processor thus is apprised of the on-hook or off-hook condition of terminal 10 as a function of the voltage level supplied to hook switch input 102. In particular, a relatively high voltage level is supplied to input 102 when terminal 10 is in its off-hook condition, whereupon switch $S_2$ is opened. Conversely, when terminal 10 is in its on-hook condition, switch $S_2$ is closed to supply a relatively low voltage level to hook switch input 102.

This on-hook/off-hook signal supplied to hook switch input 102 also is supplied to capacitor 132 by resistor 134. Accordingly, the capacitor is charged to a relatively high level when terminal 10 is in its off-hook condition, and when handset 14 is placed upon its cradle, capacitor 132 is discharged via resistor 134. When this capacitor is sufficiently discharged after a time delay determined by the RC time constant formed of resistor 134 and capacitor 132, a relatively low voltage is supplied by amplifier 136 and diode 138, which are coupled to the capacitor, to the base electrode of control transistor 130. At that time, the control transistor is rendered non-conductive and loop hold transistor 66 is deactuated.

Processor 100 also is adapted to sense the closure of the particular foot-pedal switch included in foot-pedal assembly 30. In this regard, foot-pedal assembly 30 is coupled to the A/D converter including differential amplifier 140 and charging capacitor 142, and the output of this A/D converter is coupled to a function detect input 108 of processor 100. The closure of a particular one of playback foot-pedal switch 34, rewind foot-pedal switch 36 or fast-forward foot-pedal switch 38 connects a corresponding resistor in a voltage divider circuit which is coupled to non-inverting input 140a of differential amplifier 140. The voltage-dividing circuit serves to supply a corresponding voltage level to this non-inverting input depending upon the particular foot-pedal switch which has been closed. For example, a voltage level of about 1 volt may be supplied to differential amplifier 140 when playback foot-pedal switch 34 is closed, a voltage level of about 2 volts may be supplied when fast-forward foot-pedal switch 38 is closed and a voltage level of about 3 volts may be supplied when rewind foot-pedal switch 36 is closed.

An inverting input 140b of differential amplifier 140 is coupled to capacitor 142. This capacitor is supplied with pulses derived from an A/D converter output 120 of processor 100. The capacitor is charged in response to these pulses in accordance with a successive approximation technique of a type well known to those of ordinary skill in the art. As a result, processor 100 produces a digital identification of the particular foot-pedal switch that had been closed. This representation then is supplied by processor 100 to tone generator 122, whereupon a corresponding tone signal representing the closed foot-pedal switch is transmitted over the telephone line to the dictation apparatus with which terminal 10 is in communication. Thus, the function commanded by the foot-pedal switch which has been closed is carried out. Alternatively, other A/D conversion techniques may be used to produce a digital identification of the switch which has been closed.

Processor 100 also includes a push-button detect input 106 which is coupled to push-buttons 16 for detecting the particular push-button which may be depressed by the operator. Suitable push-button detecting techniques are known to the prior art and, in the interest of brevity, are not further described herein. Suffice it to say that, by scanning the appropriate rows and/or columns of the push-button assembly, the procesor may identify the particular push-button which is depressed.

The processor also includes a memory 114 in which push-button identifying signals representing one or more predetermined telephone numbers are stored. This memory cooperates with processor 100 in a manner similar to that found in conventional automatic dialing devices such that a stored telephone number is dialed automatically merely upon the actuation by the operator of, for example, the "START" or the "REDIAL" push-button. Memory 144 also may store access codes and signals for use in accessing digitally-controlled apparatus. This too is conventional and need not be described in detail herein. Advantageously, a battery, such as a lithium battery, supplies low-current power to memory 144 even when the terminal is disconnected from the telephone line. This maintains the contents of the memory even when the terminal is in its "on-hook" condition.

Terminal 10 also includes a ring detector 70 coupled to the tip and ring leads of cable 18. This ring detector may be of conventional construction and is adapted to detect a ringing signal transmitted to the terminal over the telephone line. The ring detector produces an indication of this ringing signal to apprise the operator of an incoming telephone call.

The operation of the circuitry illustrated in FIG. 2 now will be described. Let it be assumed that the operator wishes to use terminal 10 as a simple telephone device. In the event of an incoming telephone call, ringing signal is transmitted over the telephone line to the terminal in the usual manner. This ringing signal is applied across the tip and ring leads of the telephone line and is detected by ring detector 70. A suitable indication of the ringing signal is generated, for example, a audible alarm, bell or other indication, apprising the operator of an incoming telephone call. The operator may answer this incoming telephone call by removing handset 14 from its cradle. Upon removal of the handset, hook switch $S_1$ closes and switch $S_2$, which is ganged with hook switch $S_1$, opens.

When hook switch $S_1$ closes, current flows therethrough from the tip lead, through diode 40a of polarity guard circuit 40, through closed hook switch $S_1$, through diode 40b of the polarity guard circuit to the ring lead. The voltage provided across leads 42 and 56 results in a base voltage supplied by resistor 74 to sense transistor 72 which is rendered conductive to turn on transistor 52. As a result, a DC path is established from the tip lead of the telephone line to lead 42, through hook switch $S_1$, through primary winding 46a of audio coupling circuit 44, through balancing circuit 80, through series-connected primary windings 46b and 46c, through transistor 52, through power supply 54 and through lead 56 to return to the ring lead of the telephone line. This DC current through power supply circuit 54 results in the energizing voltage +V across capacitor 60. Hence, energizing voltage is supplied from this power supply circuit to, inter alia, amplifiers 86, 90 and 140, processor 100, tone generator 122, foot-pedal assembly 30 and other circuits illustrated in FIG. 2. Therefore, terminal 10 is energized, or powered, by an energizing voltage derived from the usual DC voltage normally present across the tip and ring leads of the telephone line.

When handset 14 is removed from its cradle to open switch $S_2$, an "off-hook" signal is supplied from switch $S_2$ to hook switch input 102 of processor 100. As a result, the processor applies to its loop hold output 114 a loop hold signal which renders conductive control transistor 130, whereupon loop hold transistor 66 also is rendered conductive. This means that the telephone loop is maintained at terminal 10 even if hook switch $S_1$ is opened momentarily. Disconnection of the terminal and release of the telephone line is described below.

Initially, processor 100 responds to the "off-hook" signal applied to its hook switch input 102 to produce the handset enable signal at its handset enable output 116. Handset speaker enabling transistor 84 and handset microphone enabling transistor 88 both are rendered conductive by this handset enable signal to couple the speaker and microphone of handset 14 to audio coupling circuit 44. At this time, processor 100 does not produce the headset enable signal at its headset enable output 118 and, consequently, headset 22 is effectively inoperative. That is, audio signals are not supplied from audio coupling circuit 44 to the headset. Still further, no tone control signals are provided at tone control output 110 of the processor and, therefore, tone generator 122 supplies an enable signal from its mute output 128 to coupling transistor 82. Thus, speech signals which are induced in secondary winding 48 of audio coupling circuit 44 may be supplied through coupling transistor 82 and through handset speaker enabling transistor 84 to handset speaker 14s.

The operator now may carry on two-way communication with the party at the other end of the telephone line. Incoming speech signals are supplied to the primary windings of audio coupling circuit 44, resulting in speech signals induced in secondary winding 48, these speech signals being supplied to handset speaker 14s. Voice signals from the operator are supplied from handset microphone 14m to amplifier 86, through handset microphone enabling transistor 88 to the audio coupling circuit, and thence through transistor 52 to the tip and ring leads of the telephone line. As is conventional, a portion of the speech signals generated by the operator is fed back to handset speaker 14s by way of secondary winding 48 of the audio coupling circuit. The operator thus may hear his own voice signals which are transmitted over the telephone line.

The foregoing has described the operation of the illustrated circuitry in response to an incoming ringing signal. A similar operation occurs in the event that the operator removes handset 14 from its cradle in order to initiate a telephone call. When the handset is picked up, hook switch $S_1$ is closed and, as mentioned above, switch $S_2$ is opened. The usual DC voltage normally provided across the tip and ring leads of the telephone line now appears across leads 42 and 56, resulting in a base voltage applied by resistor 74 to transistor 72 to render this transistor conductive. Accordingly, transistor 52 is actuated to complete a DC path from lead 42 through closed hook switch $S_1$, through audio coupling circuit 44, and through transistor 52 and power supply 54 to lead 56. As before, power supply 54 derives energizing voltage +V from the DC voltage normally provided on the telephone line; and this energizing voltage +V is used to power the various electronic elements included in terminal 10.

Also, the opening of switch $S_2$ in response to the removal of handset 14 from its cradle supplies the "off" hook signal to hook switch input 102 of processor 100, thereby apprising the processor of the off-hook condition of terminal 10. The processor now supplies the loop hold signal to control transistor 130 from loop hold output 114 to render this transistor conductive and, consequently, to actuate loop hold transistor 66. Hence, inadvertent release of the telephone line is prevented in the event that hook switch S₁ is opened momentarily. Still further, the processor supplies the handset enable signal to enabling transistors 84 and 88, respectively, from handset enable output 116. Thus, handset speaker 14s is coupled by transistor 84 to audio coupling circuit 44 and handset microphone 14m is coupled by transistor 88 to primary winding 46c of the audio coupling circuit. Assuming that tone signals are not to be generated at this time, processor 100 provides no tone control signals to tone generator 122 and, therefore, the tone generator supplies the enable signal to coupling transistor 82 from its mute output 128. Consequently, secondary winding 48 is coupled through transistors 82 and 84 to handset speaker 14s, as described above.

Since the handset enable signal is produced by processor 100, the headset enable signal is not. Thus, a relatively low level signal is supplied from headset enable output 118 to headset enabling transistor 98, whereupon FET device 96 is non-conductive, effectively to inhibit headset 23 from receiving and transducing audio frequency signals from audio coupling circuit 44.

It is assumed that terminal 10 now is disposed in its telephone operating mode. In this mode, transistors 84 and 88 are rendered conductive to "enable" handset 14 to communicate with the telephone line, and FET device 96 is rendered non-conductive to inhibit headset 22 from receiving voice signals. Moreover, in the telephone operating mode, signals which may appear at function detect input 108 of processor 100 are ignored. Thus, foot-pedal assembly 30 may be operated, either intentionally or inadvertently by the operator, with no affect upon processor 100. Thus, signals with otherwise are generated in response to the operation of the foot-pedal assembly now are not supplied to the telephone line. In the telephone operating mode, foot-pedal assembly 30 is effectively inhibited.

Let it be assumed that, in the telephone operating mode, the operator wishes to dial a telephone number to establish communication between remote terminal 10 and the called station. If restricted access switch S₄ is opened to supply an "unrestricted" indicating signal to processor 100, dialing is achieved in the usual manner by the selective operation of push-buttons 16, and particularly, the selective operation of push-buttons "0"–"9".

Initially, the operator determines whether the telephone line to which terminal 10 is connected is adapted for Touch-Tone or dial pulse dialing. A "DIAL/TONE" selector switch S₃, which is included in push-buttons 16 or may be provided as a separate manually operable switch in base 12 or in the cradle of terminal 10, is operated accordingly. Depending upon the operation of switch S₃, a suitable selector signal is applied to dial-pulse/tone input 104 of processor 100. Let it be assumed that the telephone line is adapted only for dial pulse dialing. Accordingly, in the example described herein, a dial control signal is applied to input 104, whereupon processor 100 responds to the operation of push-buttons 16 to transmit dial pulses from its dial pulse output 112 to dial pulse transistor 78. As successive push-buttons are depressed, processor 100 detects such push-buttons and transmits corresponding dial pulses to the dial pulse transistor. Hence, transistor 78 is rendered conductive and non-conductive in response to such dial pulses, thereby selectively actuating sense transistor 72 which, in turn, controls the conductivity of transistor 52 to vary the impedance across the tip and ring leads of the telephone line. The central office responds to such dial pulses to effect a telephone call in the usual manner.

Alternatively, if switch S₃ is operated to supply the tone select signal to dial-pulse/tone input 104 of processor 100, the processor responds to the operation of push-buttons 16 to supply corresponding tone control signals to tone generator 122 from tone control output 110. In this operation, dial pulse transistor 78 remains non-conductive. As mentioned above, tone generator 122 responds to the tone control signals supplied thereto to transmit corresponding multi-frequency tones to amplifying transistor 126 from its tone signal output 124. These dialing tones then are transmitted across the tip and ring leads of the telephone line. Also, the tone generator applies an inhibit signal from its mute output 128 to coupling transistor 82 in response to the tone control signals which are received from processor 100. The dialing tones are transmitted over the telephone line and are fed back to handset 14 in attenuated form via resistor 81.

As a further technique for dialing a telephone number, the number which is dialed under the control of processor 100 is stored in digital form in memory 144. This number is, of course, determined by the selective operation of push-buttons 16 and will be the same digital number regardless of whether dialing is effected by dial pulse transmission or multi-frequency tone transmission. Thus, irrespective of the operation of "DIAL/TONE" selector switch S₃, memory 144 stores the digital representation of the telephone number which is dialed by the operation of the push-buttons. This stored telephone number is read out from the memory and supplied to processor 100 in response to the operation of the "REDIAL" push-button. This read-out telephone number is interpreted by processor 100 in the same manner as if push-buttons 16 had been operated. Hence, in response to the read-out telephone number, the processor supplies either dial pulses to dial pulse transistor 78 or tone control signals to tone generator 122, depending upon the operation of "DIAL/TONE" selector switch S₃. It is appreciated that this redial operation enables a relatively long telephone number (e.g. up to twenty digits) to be called merely upon the operation of a single ("REDIAL") button. It is recognized that this redial capability is known to the prior art.

As yet another dialing technique, a desired telephone number may be stored in memory 144 and read out therefrom to control processor 100 to call that read-out number. This is in addition to the aforedescribed redial operation. This storing of a desired number is effected by operating push-buttons 16 in the usual manner normally utilized by the operator to dial a telephone number. As in the redial operation, this telephone number is stored in memory 144. To maintain that number in the memory, the "PRGM" push-button is depressed and held for a predetermined time; and this prevents erasure or "overwriting" of the stored number even if a different telephone number subsequently is dialed. To read out this stored number from memory 144, the operator merely depresses the "START" button. Processor 100 responds to this read-out telephone number in the same manner in which it responds to the read-out number during a redial operation.

If restricted access switch S₄ is closed to restrict the dial-out capability of the terminal, program enable switch 17 must be operated to enable memory 144 to store the new telephone number. In the absence of operating the program enable switch, the actuation of push-buttons 16 and the "PRGM" button has no effect.

Preferably, memory 144 is provided with at least two storage compartments, one to store the telephone number then being dialed for subsequent reading out in response to the operation of the "REDIAL" button, and the other compartment for storing and retaining the desired (or "programmed") telephone number which is written into this compartment in response to the operation of the "PRGM" button. Thus, a desired number may be dialed at any time merely by the operation of the "START" button, and also the last-dialed number may be redialed merely upon the operation of the "REDIAL" button. Processor 100 responds to the telephone number read out from either compartment of memory 144 to generate either dial pulses or tone control signals, depending upon the operation of "DIAL/TONE" selector switch $S_3$.

Let it now be assumed that the operator of terminal 10 has called a central station at which dictation apparatus is disposed. Connection to this station may be confirmed by transmitting back to the operator a predetermined signal, such as an identifying tone, indicating that the central location has been reached. The operator then changes over the mode of operation of terminal 10 by depressing the "START" push-button. Processor 100 responds to this operation of the "START" button to disable handset enabling transistors 84 and 88 and to enable headset enabling transistor 98. Handset 14 thus is rendered effectively inoperative in that audio signals are not coupled to handset speaker 14s nor are audio signals coupled from handset microphone 14m to audio coupling circuit 44. Conversely, headset 22 is rendered operative, and audio signals are coupled from secondary winding 48 of the audio coupling circuit through coupling transistor 82 and through FET device 96 to the headset speakers. Thus, dictated information which is played back from the dictation apparatus located at the central station is perceived by the operator through headset 22.

When playback foot-pedal switch 34 is depressed, for example, the voltage level representative thereof is converted into a corresponding digital signal by processor 100 in cooperation with the A/D converter comprised of differential amplifier 140 and capacitor 142. The processor responds to this digital signal to supply a corresponding control signal to tone generator 122 from its tone control output 110. The tone generator then generates a corresponding control tone signal which is transmitted by amplifying transistor 126 to the telephone line, and thence to the dictation apparatus. At the same time, the tone generator supplies coupling transistor 82 with an inhibit signal from its mute output 128 and processor 100 interrupts the enable signal supplied to headset enabling transistor 98, thereby preventing the control tone signal from being fed back to headset 22. The operator thus is relieved of annoyance or possible discomfort caused by such tone signals.

Preferably, the control tone signal which is generated by tone generator 122 is of a relatively brief duration. In the present mode of operation, this control tone signal functions to command the dictation apparatus to play back previously recorded dictation. The played back audio signals are received at terminal 10, and are coupled to headset 22 from audio coupling circuit 44 via coupling transistor 82. Since the tone generator had generated only a relatively brief burst of control tone, it is appreciated that coupling transistor 82 and headset enabling transistor 98 had been inhibited only for this brief duration. Thus, the played back audio signals are readily coupled from the audio coupling circuit to the headset by way of coupling transistor 82 and FET device 96.

Upon the release of playback foot-pedal switch 34, differential amplifier 140 is supplied with a distinctive voltage representative thereof, for example, a level on the order of about zero volts. This voltage level is converted to a digital signal which is detected by processor 100. The processor then supplies a corresponding control signal to tone generator 122 from tone control output 110. Accordingly, a "stop" tone is transmitted from the tone generator to the telephone line and thence to the dictation apparatus at the central location. This "stop" tone also may be a burst signal during which the tone generator inhibits the operation of coupling transistor 82 and the processor inhibits headset enabling transistor 98.

Now, if rewind foot-pedal switch 36 is operated, processor 100 is apprised thereof and it, in turn, controls tone generator 122 to transmit a "rewind" control tone to the dictation apparatus. Alternatively, if fast-forward foot-pedal switch 38 is operated, processor 100 responds thereto to supply a corresponding control signal to tone generator 122, whereupon a "fast-forward" control tone is transmitted over the telephone line to the dictation apparatus. It will be appreciated that the dictation apparatus is provided with compatible decoding circuitry to detect the "play", "rewind", "fast-forward" and "stop" tone signals to effect these functions.

In addition to responding to the selected operation of foot-pedal assembly 30 while in the dictate/transcribe operating mode, processor 100 also is responsive to the operation of, for example, push-buttons "2" and "3" or to push-buttons "8" and "9" to apply corresponding control signals to tone generator 122. More particularly, when push-button "2" is depressed, tone generator 122 generates a speed reduction tone signal which, when detected at the dictation apparatus, reduces by a predetermined incremental amount the speed at which the record medium is advanced during a playback operation.

Conversely, tone generator 122 is controlled in response to the operation of push-button "3" to transmit a speed increase tone signal for increasing the playback speed by the aforementioned incremental amount. Processor 100 responds to the operation of push-button "8" to control tone generator 122 to generate a backspace reduction tone signal which, when detected by the dictation apparatus, reduces the quantity of record medium that is backspaced when a playback operation is interrupted. Conversely, the tone generator is controlled by the processor in response to the operation of push-button "9" to transmit a backspace increase tone signal for increasing the quantity of record medium which is backspaced when the playback operation is interrupted.

At the completion of a transcribe operation, for example, terminal 10 may be changed over to its telephone operating mode. This is achieved by depressing the "START" push-button which is detected by processor 100 to inhibit headset enabling transistor 98 and to enable handset enabling transistors 84 and 88. Also, the processor now is non-responsive to the operation of foot-pedal assembly 30, thereby rendering this assembly effectively inoperative. Telephone communication now may be carried out as described above. Thus, it is seen that processor 100 alternately establishes the telephone operating mode and the dictate/transcribe operating mode in response to the successive operations of the "start" push-button.

Let it now be assumed that handset 14 is returned to its cradle so as to open hook switch $S_1$ and close switch $S_2$. If the telephone mode had been established prior to the opening of the hook switch, processor 100 responds to the closure of switch $S_2$ to terminate the loop hold signal applied to control transistor 130 from its loop hold output 114. When transistor 130 is rendered non-conductive, loop hold transistor 66 is deactuated so as to open the telephone loop which had been established between the tip and ring leads. The telephone line thus is released.

However, let it be assumed that processor 100 has malfunctioned. In that event, it is possible that the processor does not respond properly to the closure of switch $S_2$. This means that the loop hold signal continues to be applied to control transistor 130 and, thus, loop hold transistor 66 remains actuated. As a result, even though the hook switch had been opened, the telephone line might not be released. This erroneous operation is prevented by means of capacitor 132. In particular, when switch $S_2$ closes, capacitor 132, which had been charged in response to the opening of switch $S_2$, now discharges through resistor 134. When the capacitor is sufficiently discharged, a relatively low voltage level is supplied therefrom to control transistor 130 to render this transistor non-conductive. As a result, loop hold transistor 66 is deactuated and the telephone loop is opened to release the telephone line.

Let it be assumed that the dictate/transcribe operating mode had been established and that the operator has completed a transcribe operation. In this mode, when the hook switch is opened, processor 100 is apprised thereof by the on-hook signal supplied from switch $S_2$ to its hook switch input 102. Assuming that the processor has not malfunctioned, a control signal is supplied from its tone control output 110 to tone generator 122 for transmitting a "hang-up" tone signal over the telephone to the dictation apparatus. As an example, this "hang-up" tone signal may be the same tone signal which would be produced if push-button "5" is depressed.

The dictation apparatus responds to this "hang-up" tone signal to disconnect from the telephone line and to effect additional operations normally associated with the completion of a transcribe operation.

It will be appreciated that the transmission of this "hang-up" tone signal to the dictation apparatus overcomes problems that may be associated with the particular telephone system with which terminal 10 is used. For example, the telephone switching equipment might not supply a hang-up signal to the dictation apparatus when terminal 10 returns to its on-hook condition. In the absence of such a signal, the dictation apparatus would remain connected to the telephone line, but further telephone calls thereto would not be completed. Although the operator at terminal 10 could transmit the "hang-up" tone signal manually, such as by depressing push-button "5", it is highly probable that this additional operation will be forgotten. By transmitting the "hang-up" tone automatically, and thereafter deactuating loop hold transistor 66, these problems and disadvantages are avoided.

While the foregoing explanation has described remote terminal 10 in the configuration of a transcribe unit, it will be readily appreciated to those of ordinary skill in the art that this terminal can be used as a dictate unit. For example, suitable hand-operated switches, such as those described in U.S. Pat. No. 3,872,273, may be provided on handset 14 in place of foot-pedal assembly 30. Nevertheless, processor 100 would cooperate with such hand-operated switches in substantially the same way as it cooperates with the foot-pedal assembly described hereinabove. Also, when used as a dictate unit, headset 22 may be omitted, and processor 100 may operate to render conductive the handset enable transistors 84 and 88 to maintain effective coupling between the handset and audio coupling circuit 44.

The manner in which processor 100 operates now will be briefly described with respect to the flow charts shown in FIGS. 3-7. It will be appreciated that these flow charts are intended to aid in the overall understanding of the operation of the processor. Such flow charts are not intended to be a representation of each and every detailed step in the program by which the processor operates. Those of ordinary skill in the programming art will be enabled by the following description to program a suitable microprocessor so as to make and use the present invention.

Figure 3:
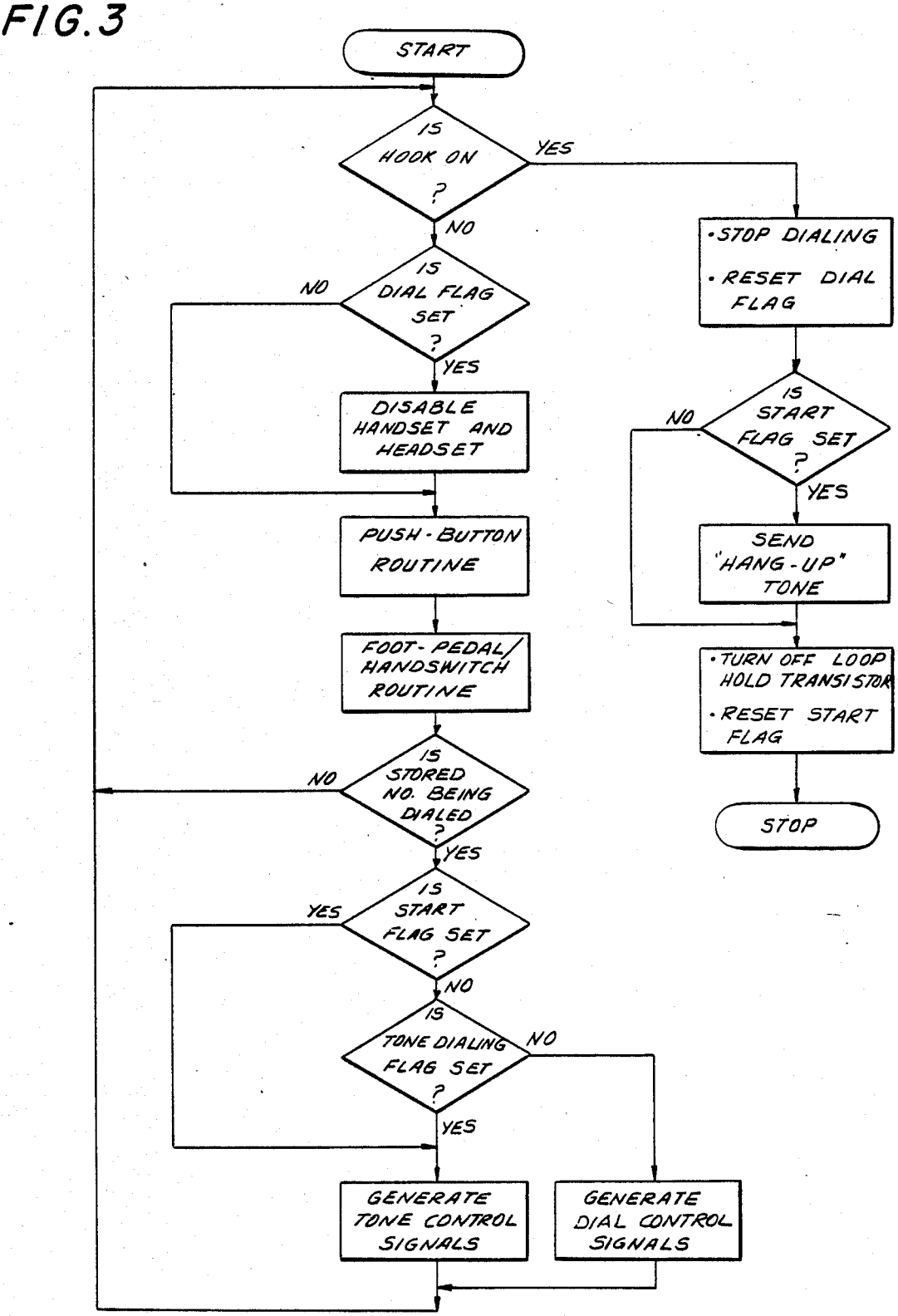
FIGS. 3-7 are flow charts which describe certain operations of the processor used with this invention.

FIG. 3 illustrates a flow chart representing the main, or overall, routine followed by processor 100. Initially, inquiry is made as to whether handset 14 is in its on-hook condition. This condition may be sensed by, for example, the signal supplied to hook switch input 102 of processor 100. If it is determined that the handset is in its off-hook condition, this inquiry is answered in the negative and inquiry next is made as to whether a dial flag is set. As will be described below, the dial flag is set when a telephone number is being dialed, such as when push-buttons 16 are operated by the user. If the dial flag is set, that is, if a telephone number is being dialed, the handset and headset are disabled by rendering transistors 82 and 98, respectively non-conductive. Next, the microprocessor carries out its push-button routine. It will be appreciated that this routine is carried out in the event that the handset is in its off-hook condition and the dial flag is not set. The push-button routine is described below with respect to the flow chart shown in FIG. 4.

After the push-button routine is carried out, the foot-pedal/handset routine is executed. This routine senses the actuation of any of the switches included in foot-pedal assembly 30 or, in the event that terminal 10 is configured as a dictate terminal, this routine senses the operation of switches that are provided on handset 14. This foot-pedal/handset routine is described below with respect to the flow chart shown in FIG. 6.

After carrying out the foot-pedal/handset routine, inquiry is made as to whether a stored telephone number is being dialed. If not, the processor returns to the START of the overall routine illustrated in FIG. 3. However, if a stored number is being dialed, inquiry is made as to whether the "start" flag is set. This flag is set in the event that the "START" push-button is operated to establish the dictate/transcribe mode of operation. If this flag is set, tone control signals are generated, such as in response to the operation of foot-pedal assembly 30. However, if the "start" flag is not set, and when terminal 10 is disposed in its telephone operating mode, inquiry is made as to whether the tone dialing flag is set. It will be appreciated that this flag is set in the event that the "DIAL/TONE" push-button is operated to condition terminal 10 to supply multifrequency tone signals to the telephone line. If this flag is set, tone control signals are generated in response to the operation of push-buttons 16. However, if the "tone dialing" flag is not set, dial control signals are supplied from processor 100 to dial pulse transistor 78 in response to the operation of the push-buttons. The processor then returns to the START of its overall routine.

If the initial inquiry as to whether handset 14 is in its on-hook condition is answered in the affirmative, as when the handset is returned to its cradle, any dial-out operation then in progress is terminated and the dial flag, if set, is reset. Then, inquiry is made as to whether the "start" flag is set. If not, loop hold transistor 66 is rendered non-conductive and the "start" flag is reset (this being an unnecessary operation if the "start" flag had not been set). Thereafter, the processor advances to its STOP condition which includes a "power-down" routine to account for the removal of energizing power from all but memory 144.

If the terminal is in its on-hook condition and the "start" flag is set, the predetermined "hang-up" tone signal is transmitted over the telephone line. It is recalled that this tone signal apprises the dictation apparatus with which terminal 10 had been communicating that the terminal has hung up. This frees the dictation apparatus to allow access thereto to other terminals. Thereafter, loop hold transistor 66 is rendered non-conductive and the "start" flag is reset.

In the present embodiment, it is contemplated that the "hang-up" tone is transmitted when handset 14 returns to its on-hook condition in the event that it had been communicating with dictation apparatus. That is, this tone signal is transmitted if the "start" flag had been set. Alternatively, the "hang-up" tone signal may be generated whenever the handset is replaced on its cradle irrespective of the operating mode exhibited by terminal 10.

Figure 4:
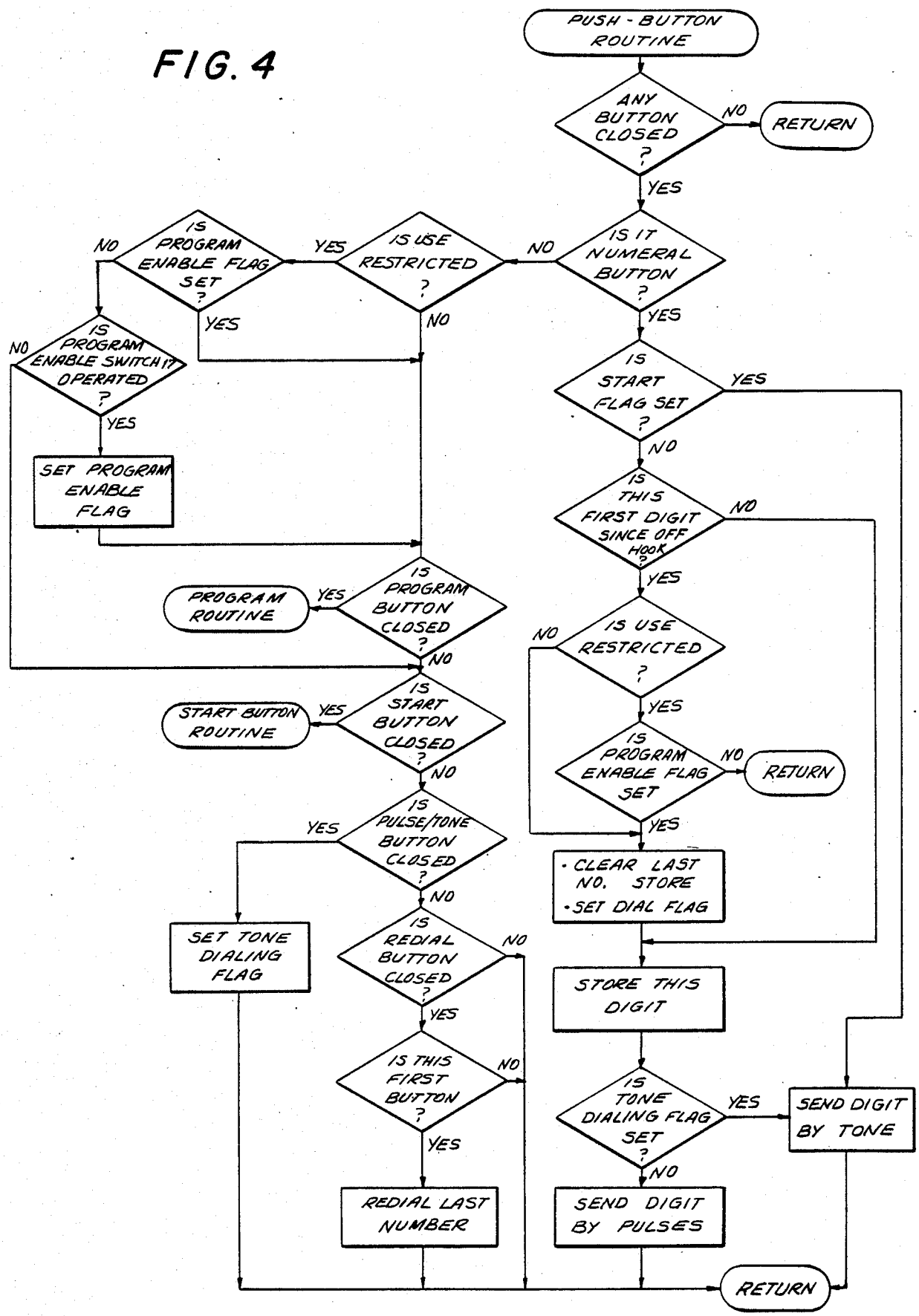

Referring now to FIG. 4, there is illustrated a flow chart of the push-button routine that is carried out at each cycle of the overall routine when handset 14 is in its off-hook condition. In the push-button routine, inquiry first is made as to whether any of push-buttons 16 or program enable button 17 is closed. If this inquiry is answered in the negative, the processor exits from the push-button routine to carry out the foot-pedal/handset routine (described below).

Let it be assumed, however, that a push-button or the program enable button is closed. Inquiry next is made as to whether the closed button is a numeral button. If the button is not a numeral button, for example, if the "PRGM" or the "DIAL/TONE" or the "REDIAL" or the "START" or the "PROGRAM ENABLE" button is closed, inquiry next is made as to whether terminal 10 is disposed for restricted use. It is recalled that, if terminal 10 is conditioned for restricted use, dialing signals are transmitted only in response to the operation of the "START" button. The operation of push-buttons 16 to carry out a dialing operation in the event that the terminal is conditioned for restricted use has no effect.

If the terminal is conditioned for restricted use, inquiry next is made as to whether the "program enable" flag is set. The purpose of the "program enable" flag is to permit an authorized operator to change the predetermined telephone number which is dialed in response to the actuation of the "START" button when terminal 10 is conditioned for restricted use. If this "program enable" flag is set, the push-button routine advances to inquire whether the "PRGM" button is closed. However, if the "program enable" flag is not set, inquiry is made as to whether the "PROGRAM ENABLE" switch 17 has operated. If it has, the "program enable" flag is set and inquiry next is made as to whether the "PRGM" button is closed. However, if the "program enable" switch 17 was not operated, the push-button routine advances to inquire whether the "START" button is closed.

As mentioned above, if terminal 10 is not conditioned for restricted use or, alternatively, the terminal is disposed for restricted use but the "program enable" flag is set, inquiry is made as to whether the "PRGM" button is closed. If it is, the processor advances to its program routine, described below with respect to FIG. 5. However, if the "PRGM" button is not closed, or if terminal 10 is disposed for restricted use but the "PROGRAM ENABLE" switch 17 had not been operated, inquiry is made as to whether the closed push-button is the "START" button. If the "START" button is being operated, the processor advances to its start button routine, described below with respect to the flow chart shown in FIG. 7. As will be described, the operation of this "START" button serves to toggle the operating mode of terminal 10 between its telephone and dictate/transcribe modes, and also, the operation of the "START" button serves to generate dialing signals representing the predetermined telephone number stored in memory 144.

If the "START" button is not closed, inquiry is made as to whether the "PULSE/TONE" button is closed. If so, the "tone dialing" flag is set to transmit dialing signals in the form of multi-frequency tones. Then, the processor exits from its push-button routine to advance to the foot-pedal/handset routine, as mentioned above with respect to the overall routine shown in FIG. 3.

If the "PULSE/TONE" button is not closed, inquiry is made as to whether the "REDIAL" button is closed. If not, the processor exits from its push-button routine. However, if the "REDIAL" button is closed, inquiry is made as to whether this is the first push-button that has been closed. If this inquiry is answered in the affirmative, the last number dialed is redialed. However, if the "REDIAL" button had been closed after other push-buttons had been operated, the processor merely exits from its push-button routine.

Returning to the beginning of the push-button routine, if the push-button which is closed is a numeral button, inquiry is made as to whether the "start" flag is set. The setting of this flag is described below in conjunction with the start button routine, illustrated in FIG. 7. If this inquiry is answered in the affirmative, a tone signal corresponding to the numeral push-button which is closed is transmitted over the telephone line, and the processor exits from its push-button routine. However, if the "start" flag had not been set, inquiry is made as to whether the closed push-button is the first button that has been operated since the handset had been removed from its cradle. If this is the first push-button, inquiry is made as to whether terminal 10 is disposed for restricted use. If it is, inquiry next is made as to whether the "program enable" flag is set. If this inquiry is answered in the negative, that is, if the terminal is disposed for restricted use and the "PROGRAM ENABLE" switch 17 had not been operated, the processor merely exits from its push-button routine. But, if the terminal is not disposed for restricted use or, alternatively, if the use of the terminal is restricted but the "PROGRAM ENABLE" switch 17 had been operated, that portion of memory 144 which stores the preceding telephone number is cleared and, additionally, the "dial" flag is set. Then, the digit represented by the operated numerical push-button is stored in the redial portion of memory 144.

From the flow chart shown in FIG. 4, if the operated numerical push-button is not the first button to have been closed since handset 14 was removed from its cradle, the digit represented by this push-button merely is stored in memory 144.

After the numerical representation of the operated push-button is stored, inquiry is made as to whether the "tone dialing" flag is set. If so, the tone signal representing this digit is transmitted over the telephone line. But, if the tone dialing flag is not set, a representation of this digit is transmitted by dial pulses. Thus, depending upon whether terminal 10 is coupled to a telephone line adapted for Touch-Tone dialing, each operation of a numerical push-button is transmitted either as a multi-frequency tone signal or as dial pulses. However, if the "start" flag is set, as when the terminal is disposed in its dictate/transcribe mode, tone signals are transmitted in response to the operation of push-buttons 16.

Figure 5:
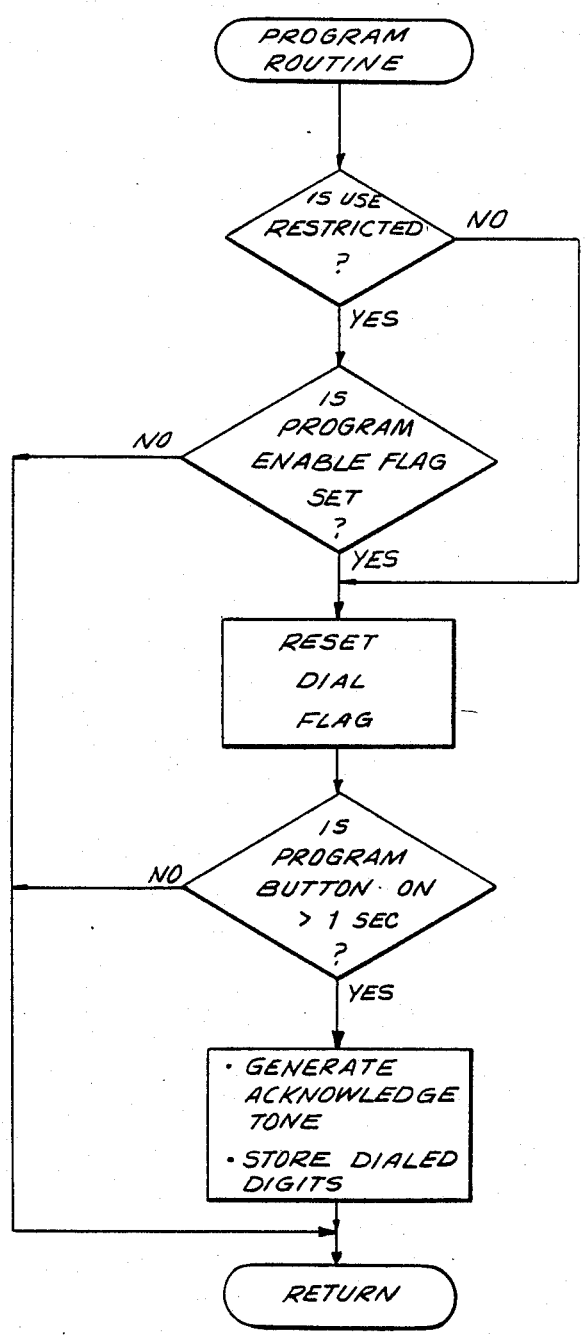
Figure 6:
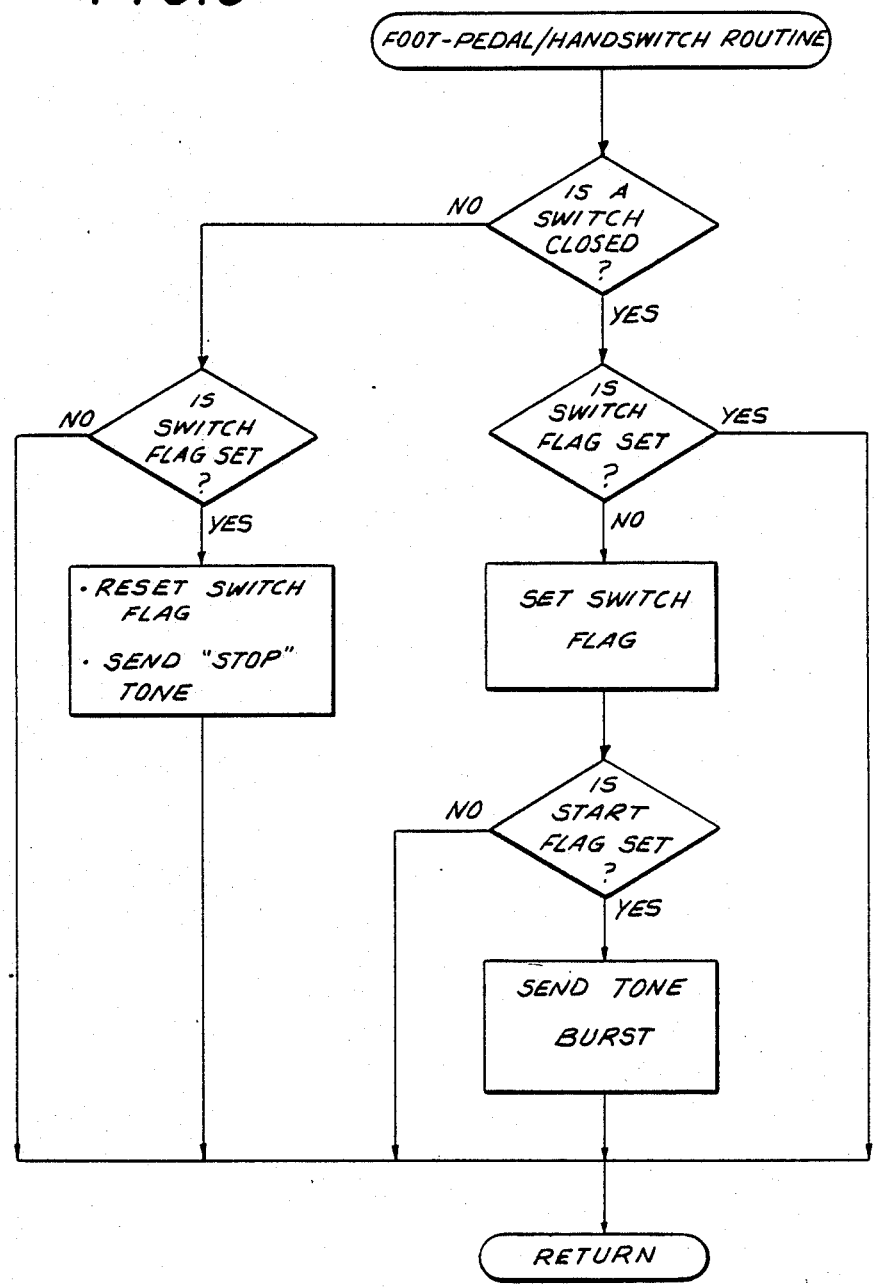

Turning now to FIG. 5, there is illustrated a flow chart of the program routine which is carried out in the event that the "PRGM" button is closed. From FIG. 4, it is appreciated that this program routine is executed if terminal 10 is disposed for unrestricted use or, alternatively, if the "program enable" flag is set. It also is recalled that this "program enable" flag is set if "PROGRAM ENABLE" switch 17 is operated.

The initial inquiry of the program routine is whether the terminal is disposed for restricted use. If not, the dial flag, which had been set in response to the operation of the first numeral button, is reset and an inquiry is made as to whether the "PRGM" button has been operated for greater than one second.

If the terminal is disposed for restricted use, inquiry is made as to whether the "program enable" flag is set. If this inquiry is answered in the negative, the processor exits from its program routine and advances to the foot-pedal/handset routine, as shown in FIG. 3. However, if the "program enable" flag had been set, the dial flag is set, and the program routine advances to inquire as to whether the "PRGM" button has been operated for greater than one second. If so, an acknowledgement tone is generated to advise the user of the terminal that the telephone number which he has generated by operating the numerical push-buttons is stored (a representation of such telephone number is stored in memory 144), and the processor exits from its program routine to proceed now with the foot-pedal/handset routine. If the "PRGM" button had not been operated for greater than one second, the acknowledgement tone is not generated and a representation of the telephone number is not stored. The processor merely exits from the program routine and advances to the foot-pedal/handset routine. It will be appreciated that the processor cycles through its overall routine shown in FIG. 3 and, in the event that the "PRGM" button remains operated, the processor also cycles through the push-button and program routines. Ultimately, the "PRGM" button will have been operated for greater than one second and, hence, a representation of the telephone number dialed by the user will be stored.

Turning now to the foot-pedal/hand switch routine, which is carried out after the push-button routine in accordance with the embodiment shown in FIG. 3, inquiry is made as to whether a switch (whether included in foot pedal assembly 30 or provided on handset 14) is closed. If not, inquiry is made as to whether the "switch" flag has been set. If not, the processor exits from the foot-pedal/hand switch routine to continue with the overall routine shown in FIG. 3. However, if the "switch" flag had been set, then, since a switch now is not closed, the "switch" flag is reset and a "stop" tone is transmitted. It is recalled that this "stop" tone is received by the dictation apparatus to terminate the operation that had been carried out and to render a stop mode by which it stands by for further commands. After the "stop" tone is transmitted, the processor exits from the foot-pedal/hand switch routine.

If, on entering the foot-pedal/hand switch routine, a switch is closed, inquiry is made as to whether the "switch" flag is set. If it is, the processor exits from this routine, and no change in command is transmitted to the dictation apparatus. Thus, whatever operation had been carried out by the dictation apparatus in response to the closure of this switch is continued.

However, if a switch had been closed and if the "switch" flag is not set, it is assumed that the switch now is closed for the first time and, therefore, the "switch" flag is set. Next, inquiry is made as to whether the "start" flag has been set. If not, the operation of this switch is to be ignored and no command signal is transmitted from the terminal to the dictation apparatus. Rather, the processor merely exits from the foot-pedal/hand switch routine and continues with the overall routine shown in FIG. 3. But, if the "start" flag had been set, a burst of tone signal corresponding to the operated switch is transmitted to the dictation apparatus. It is appreciated that this transmitted tone burst functions as a command or control signal, and the dictation apparatus responds thereto to carry out the particular operating function commanded by this tone.

Figure 7:
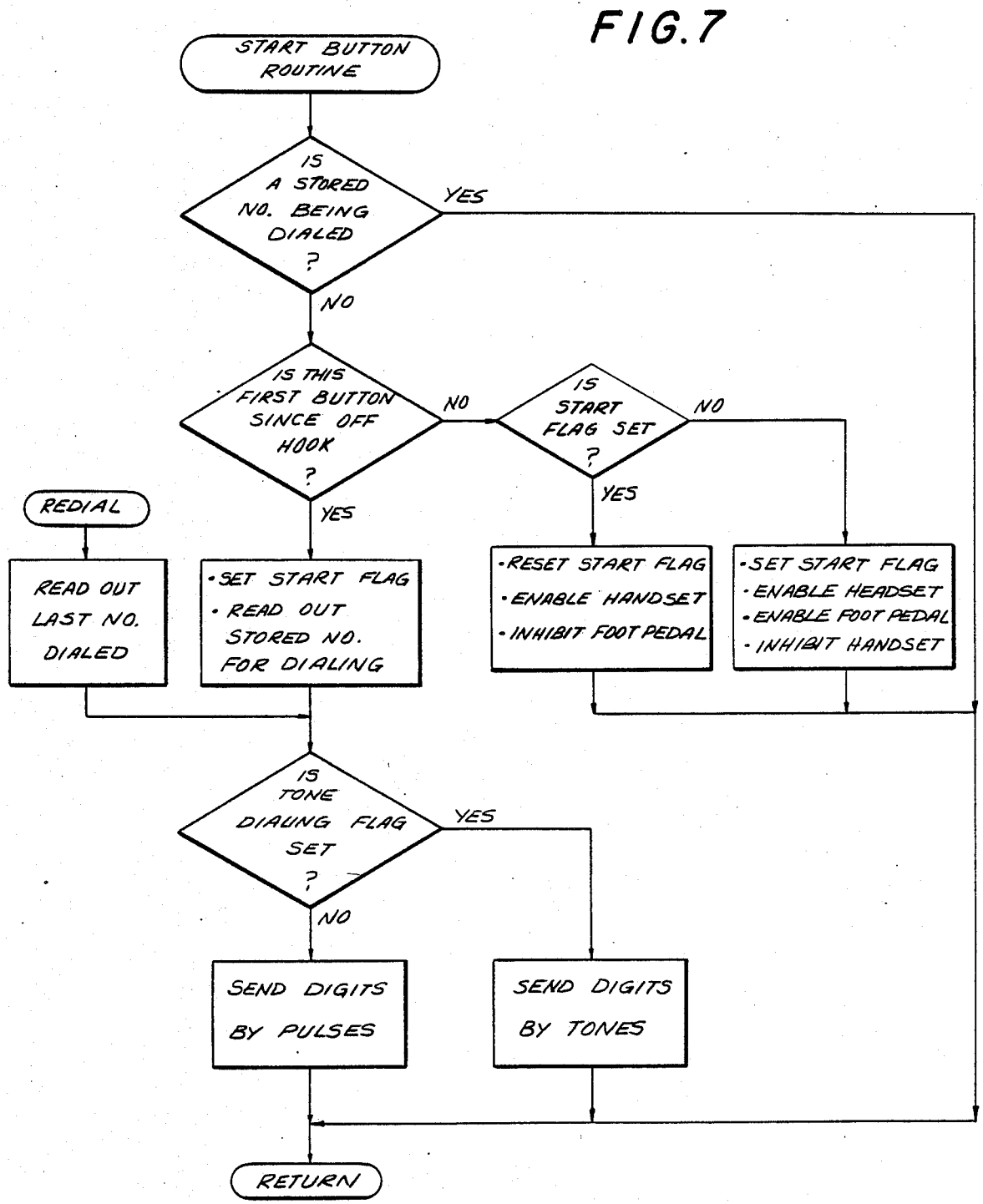

Referring now to FIG. 7, there is illustrated a flow chart of the START button routine that is carried out in the event that the "START" button is closed. This routine is entered from the push-button routine, as shown in FIG. 4. When the "START" button is closed, inquiry is made as to whether a stored number is being dialed by the terminal. If so, the processor merely exits from the START button routine and also from the push-button routine, to continue with the overall routine shown in FIG. 3. However, if a stored telephone number is not being dialed, inquiry is made as to whether the "START" button is the first button to have been operated since the handset was removed from its cradle.

If the "START" button is not the first push-button to have been operated since the terminal had been placed in its off-hook condition, inquiry is made as to whether the "start" flag has been set. If so, this flag is reset, the handset is enabled, that is, handset enabling transistors 84 and 88 are rendered conductive, and the operation of foot-pedal assembly 30 is inhibited. In addition, headset enabling transistor 98 is rendered non-conductive. Thus, on resetting the "start" flag, terminal 10 is disposed in its telephone operating mode. The processor then exits from the START button routine.

However, if the start flag had not been set, then the operation of the "START" button results in setting the "start" flag, rendering headset enabling transistor 98 conductive, enabling the operation of foot-pedal assembly 30 and rendering handset enabling transistors 84 and 88 non-conductive. Thus, the setting of the start flag also serves to dispose terminal 10 in its dictate/transcribe mode of operation. The processor then exits from the START button routine.

When a telephone number is not presently being dialed, and if the "START" button is the first push-button which has been operated since terminal 10 was disposed in its off-hook condition, the "start" flag now is set and the telephone number stored in memory 144 now is read out. Inquiry is made as to whether the "tone dialing" flag is set (i.e. whether the terminal is coupled to a telephone line adapted for Touch-Tone dialing) and, if so, the telephone number is transmitted on a digit-by-digit basis by multi-frequency tone signals. However, if the "tone dialing" flag had not been set, that is, if it is assumed that the telephone line coupled to terminal 10 is not adapted for Touch-Tone dialing, the telephone number read out of memory 144 is transmitted by dial pulses. The processor then exits from its START button routine.

As shown in FIG. 7, the automatic dialing of a telephone number also is carried out in the event that the "REDIAL" button is closed. This automatic redialing of the previous telephone number has been described above with reference to the flow chart shown in FIG. 4. As shown in FIG. 7, if the "REDIAL" button is closed, and if this is the first push-button which has been closed since handset 14 has been removed from its cradle, the representation of the immediately preceding telephone number which is stored in the redial compartment of memory 144 is read out therefrom. Then, this read out telephone number is dialed either by multi-frequency tone signals or by dial pulses, depending upon whether the "tone dialing" flag is set.

While the present invention has been particularly shown and described with reference to a preferred embodiment, it will be readily appreciated by those of ordinary skill in the art that various changes and modifications in form and detail may be made without departing from the spirit and scope of the invention. Processor 100 may be, for example, a Model 8048 microprocessor, a device well known to those of ordinary skill in the art. The programming of such a microprocessor also is known, and the aforedescribed flow charts shown in FIGS. 3–7 may be readily implemented with a Model 8048 microprocessor. It is to be understood that these flow charts merely are illustrations of the functional operation of the processor, and modifications may be made therein by those of ordinary skill in the programming art.

It is intended that the appended claims be interpreted as including those changes which have been described above as well as other modifications equivalent thereto.

What is claimed is:

1. A remote terminal for connection to a telephone line to enable a user thereof to carry on a telephone conversation or to control dictation apparatus coupled to said telephone line, said terminal comprising:
   connection means for seizing said telephone line and for connecting said terminal thereto;
   dial signal generating means for generating dial signals to dial a telephone number;
   microphone means for transmitting speech signals to said telephone line;
   speaker means for receiving speech signals from said telephone line, and for converting the received speech signals to audio sounds;
   function control switch means manually operable to cause function control signals to be transmitted to said telephone line for controlling the operation of said dictation apparatus;
   hang-up means operable to release said telephone line;
   disconnect means responsive to the operation of said hang-up means for disconnecting said terminal from said telephone line a predetermined period of time after said hang-up means is operated;
   hang-up signal generating means responsive to the operation of said hang-up means for transmitting over said telephone line a predetermined hang-up signal prior to the disconnection of said terminal from said telephone line; and
   processor means for controlling the dial signals generated by said dial signal generating means, the function control signals transmitted by the operation of said function control switch means, the operation of said disconnect means, and the transmission by said hang-up signal generating means of said hang-up signal.

2. The terminal of claim 1, further comprising mode selecting means for selecting a telephone mode for said terminal, whereby said function control switch means are rendered effectively inoperative, or a dictation apparatus control mode for said terminal, whereby said function control switch means are rendered effectively operative; and wherein said processor means senses said dictation apparatus control mode to enable said hang-up signal generating means to transmit said hang-up signal in response to the operation of said hang-up means.

3. The terminal of claim 2 whrein said connection means comprises hook switch means closable to connect said terminal to said telephone line, and semiconductor means connected in shunt with said hook switch means; and wherein said hang-up means comprises means responsive to the opening of said hook switch means for commanding release of said telephone line; and wherein said disconnect means includes means for rendering said semiconductor means non-conductive when release of said telephone line is commanded.

4. The terminal of claim 1 wherein said connection means includes hook switch means for seizing said telephone line; and wherein said speaker and microphone means are included in handset means manually positionable between an on-hook condition to open said hook switch means and an off-hook condition to close said hook switch means.

5. The terminal of claim 4 wherein said transducer means further includes headset means having a speaker operative to receive audio frequency signals played back from said dictation apparatus.

6. The terminal of claim 4 further comprising handset enabling means and headset enabling means respectively coupled to said connection means and mutually exclusively controlled by said processor means for enabling audio frequency signals to be transmitted between said audio coupling means and said handset and headset means, respectively.

7. The terminal of claim 6 wherein each of said enabling means is comprised of transistor switch means.

8. The terminal of claim 6 wherein said function control switch means includes push-button means selectively operable to cause said processor means to control the transmission of said function control signals, said processor means being responsive to the operation of a predetermined push-button to control said headset enabling means for enabling audio frequency signals to be transmitted to said headset means.

9. The terminal of claim 8 wherein said processor means is responsive to successive operations of said predetermined push-button to alternately enable said headset enabling means and said handset enabling means and to control the transmission of said function control signals alternately in response to said function control switch means and to said push-button means, whereby said terminal operates alternately as a remote transcribe device and as a telephone set.

10. The terminal of claim 1 wherein said dial signal generating means comprises pushbutton means, the actuation of which is sensed by said processor means, and signal supplying means controlled by said processor means in response to the actuation of said pushbutton means for supplying to said telephone line signals corresponding to the actuated pushbutton means.

11. The terminal of claim 10 wherein said signal supplying means comprises tone signal generating means for supplying dialing tone signals to said telephone line.

12. The terminal of claim 10 wherein said signal supplying means comprises pulse generating means for supplying dialing pulse signals to said telephone line.

13. The terminal of claim 10 wherein said signal supplying means comprises tone signal generating means for selectively supplying dialing tone signals to said telephone line; pulse generating means for selectively supplying dialing pulse signals to said telephone line; selector switch means for selecting dialing tone or dialing pulse signals; and said processor means being responsive to said selector switch means for operating said tone signal generating means of said pulse generating means in response to the actuation of said pushbutton means.

14. The terminal of claim 10 wherein said dial signal generating means further comprises memory means for storing dial signal data; and selectively operable read out means for reading out the stored dial signal data; and wherein said processor means is responsive to the read out dial signal data for controlling said signal supplying means to supply corresponding signals to said telephone line.

15. The terminal of claim 1 wherein said function control signals comprise tone signals; and further comprising tone signal generating means controlled by said processor means in response to the actuation of said function control switch means for transmitting said tone signals to said telephone line.

16. The terminal of claim 15 wherein said function control switch means comprise foot-pedal switches; and wherein said processor means is responsive to selective actuation of said foot-pedal switches to control said tone signal generating means to transmit corresponding tone signals to said telephone line.

17. The terminal of claim 16, wherein said foot-pedal switches generate selected signal levels in response to the actuation thereof; and further comprising analog-to-digital converter means coupled to said foot-pedal switches to convert the generated signal levels to corresponding digital signals and to supply said digital signals to said processor means for controlling the tone signals transmitted to said telephone line.

18. The terminal of claim 1 further comprising
use restriction means selectively operable to a first condition to restrict the operation of said dial signal generating means to generate dial signals representing a stored predetermined telephone number and to a second condition to enable the operation of said dial signal generating means to generate dial signals representing substantially any telephone number dialed by said user;
storage means for storing a representation of said predetermined telephone number; and
manually operable means operated by said user to produce representations of a telephone number to be dialed; and wherein said processor means senses said first condition of said use restriction means to read out from said storage said representation of said predetermined telephone number and controls said dial signal generating means in response thereto, and said processor means senses said second condition of said use restriction means to control said dial signal generating means in response to the representations of a telephone number produced by said manually operable means.

19. The terminal of claim 18 further comprising means for changing the stored representation of said predetermined telephone number, including:
program switch means manually operable to write into said storage means telephone number representations derived from the operation of said manually operable means; and
program enable switch means selectively operable to enable the operation of said program switch means in the event that said use restriction mens is in said first condition, and wherein said processor means inhibits telephone number representations from being written into said storage means in response to the operation of said program switch means when said use restriction means is in said first condition unless said program enable switch means is operated, and said processor means enables telephone number representations to be written into said storage means in response to the operation of said program switch means when said use restriction means is in said second condition.

\* \* \* \* \*